F. PILANT.
NUT LOCK.
APPLICATION FILED APR. 20, 1912.
1,059,756.
Patented Apr. 22, 1913.
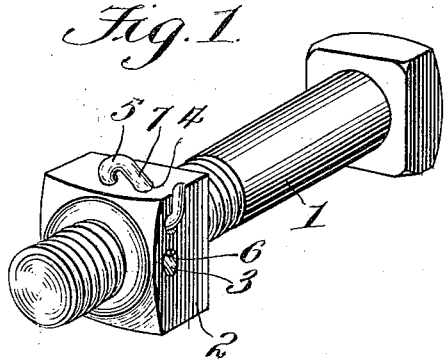
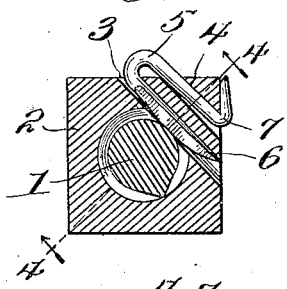
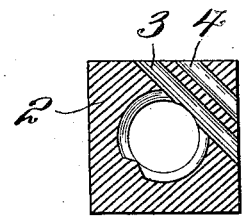
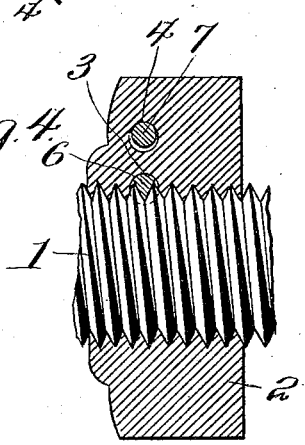
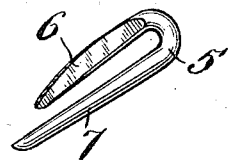
Witnesses
Inventor
Fred Pilant,
By Victor J. Evans,
Attorney

UNITED STATES PATENT OFFICE.

FRED PILANT, OF GRANBY, MISSOURI.

NUT-LOCK.

1,059,756.     Specification of Letters Patent.     Patented Apr. 22, 1913.

Application filed April 20, 1912. Serial No. 692,000.

*To all whom it may concern:*

Be it known that I, FRED PILANT, a citizen of the United States, residing at Granby, in the county of Newton and State of Missouri, have invented new and useful Improvements in Nut-Locks, of which the following is a specification.

This invention relates to nut locks and the object of the invention is the construction of a nut lock which will be simple, cheaply constructed, and efficient in the performances of all of its functions.

Further objects of this invention will appear as the following specific description is read in connection with the accompanying drawing, which forms a part of this application, and in which:—

Figure 1 is a perspective view. Fig. 2 is a sectional view showing the bolt and locking key in place. Fig. 3 is a similar view with the bolt and key removed. Fig. 4 is a section on the line 4—4 of Fig. 2. Fig. 5 is a perspective view of the key used.

Referring more particularly to the drawing, 1 represents the bolt of ordinary formation upon which is threaded the usual nut 2. This nut is provided with a pair of apertures extending parallel with the base of the nut and diagonal across one corner thereof, as shown in Fig. 2. The apertures are shown at 3 and 4, the former being the innermost aperture which passes through the nut in such a manner as to expose the full depth of the bolt threads therein, when said bolt is threaded into the nut. The key consists of a suitable staple shaped member 5, the legs 6 and 7 of which are of different lengths, the former being the shorter leg of the two and having its outer side beveled so as to conform or fit the threads of the bolt. The latter leg 7 is tapered so as to readily enter the aperture 4 and is sufficiently pliable to be bent over the side of the nut to the position shown in Fig. 1 after the key has been driven home, as will be readily understood.

In the operation of the device the nut is screwed home on the bolt and the key driven in place with its beveled side edge fitting the threads and the long leg thereof which projects beyond the bolt is bent backwardly or as shown in Fig. 1, which prevents the removal of the key and holds the same in engagement with the threads. By straightening the long leg of the key, the same may be readily removed from the nut and used again.

What is claimed is:—

The combination of a bolt, a nut having a pair of parallel openings extending diagonally across one corner of the nut and to one side of the bolt, the inner opening being constructed to expose the full depth of the bolt threads in the opening, and a staple shaped locking key having one leg shorter than the other and adapted to be contained entirely within the inner opening, said leg being beveled on one side to fit the bolt threads, the opposite leg of said key adapted to extend through the outer opening and being bent to prevent removal from the nut.

In testimony whereof I affix my signature in presence of two witnesses.

FRED PILANT.

Witnesses:
W. F. BIRKER,
J. C. HASH.

Copies of this patent may be obtained for five cents each, by addressing the "Commissioner of Patents, Washington, D. C."